US009797999B2

(12) United States Patent
Lee et al.

(10) Patent No.: US 9,797,999 B2
(45) Date of Patent: Oct. 24, 2017

(54) DISPLAY APPARATUS WITH RF SENSOR AND USER DETECTION METHOD USING RF SENSOR

(71) Applicant: SAMSUNG ELECTRONICS CO., LTD., Suwon-si (KR)

(72) Inventors: Sung-han Lee, Hwaseong-si (KR); Kun-sok Kang, Yongin-si (KR); Byung-seok Soh, Yongin-si (KR); Chang-won Son, Dalseo-gu (KR); Sang-on Choi, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 91 days.

(21) Appl. No.: 14/807,453

(22) Filed: Jul. 23, 2015

(65) Prior Publication Data

US 2016/0054436 A1  Feb. 25, 2016

(30) Foreign Application Priority Data

Aug. 19, 2014  (KR) .......................... 10-2014-0107962

(51) Int. Cl.
*G01S 13/04* (2006.01)
*G01S 13/86* (2006.01)
*G06F 3/0482* (2013.01)
*G09G 3/36* (2006.01)
*G09G 3/20* (2006.01)

(52) U.S. Cl.
CPC .............. *G01S 13/04* (2013.01); *G01S 13/86* (2013.01); *G06F 3/0482* (2013.01); *G09G 3/20* (2013.01); *G09G 2330/022* (2013.01); *G09G 2354/00* (2013.01)

(58) Field of Classification Search
None
See application file for complete search history.

(56) References Cited

U.S. PATENT DOCUMENTS 7,199,749 B2    4/2007  Greneker, III et al.
8,792,930 B1 *  7/2014  Gopalakrishnan ..... H01Q 1/243
                                                       455/117

(Continued)

FOREIGN PATENT DOCUMENTS

DE         4013049 A1    10/1990

OTHER PUBLICATIONS

"Patent Map for RF-Based User Detection", Jan. 29 2014, 34 pages total, DMC Lab. IP Application Team.

*Primary Examiner* — Kent Chang
*Assistant Examiner* — Benjamin Morales Fernande
(74) *Attorney, Agent, or Firm* — Sughrue Mion, PLLC (57) ABSTRACT

A display apparatus with a radio frequency (RF) sensor and a user detection method using an RF sensor are provided. The display apparatus includes: a display panel configured to display an image; a support frame located in a back area of the display panel and configured to support parts of the display apparatus; and a radio frequency (RF) sensor configured to be arranged in the support frame for performing one of transmitting a radio frequency signal to a front area of the display panel and receiving the radio signal from the front area of the display panel, wherein the radio frequency signal which is transmitted or received passes through the display panel.

36 Claims, 8 Drawing Sheets

(56) References Cited

U.S. PATENT DOCUMENTS

| | | | | |
|---|---|---|---|---|
| 8,798,695 B1* | 8/2014 | Zheng | G06F 1/1698 | 455/575.7 |
| 8,860,892 B2* | 10/2014 | Nam | H04N 5/64 | 348/836 |
| 2006/0166681 A1* | 7/2006 | Lohbihler | G01S 5/02 | 455/456.2 |
| 2010/0277411 A1* | 11/2010 | Yee | G06F 3/017 | 345/156 |
| 2010/0306685 A1* | 12/2010 | Giaimo, III | A63F 13/10 | 715/765 |
| 2012/0019149 A1* | 1/2012 | Shih | H05B 37/0227 | 315/149 |
| 2012/0077554 A1* | 3/2012 | Ahn | H04W 52/027 | 455/574 |
| 2012/0137253 A1* | 5/2012 | Eom | G06F 3/0481 | 715/835 |
| 2012/0236040 A1* | 9/2012 | Eom | G09G 3/007 | 345/681 |
| 2012/0280900 A1* | 11/2012 | Wang | G06F 3/0488 | 345/156 |
| 2013/0181948 A1* | 7/2013 | Sakai | G06F 3/0425 | 345/175 |
| 2013/0250034 A1* | 9/2013 | Kang | H04W 4/02 | 348/14.02 |
| 2014/0024356 A1* | 1/2014 | Yoon | H04W 8/22 | 455/418 |
| 2014/0118272 A1* | 5/2014 | Gunn | G06F 3/0488 | 345/173 |
| 2014/0213178 A1* | 7/2014 | Wolff | H01P 11/00 | 455/41.1 |
| 2014/0298672 A1* | 10/2014 | Straker | H04W 12/06 | 34/175 |
| 2014/0344608 A1* | 11/2014 | Wang | G06F 1/3287 | 713/324 |
| 2015/0177374 A1* | 6/2015 | Driscoll | H01Q 1/42 | 342/22 |
| 2015/0277545 A1* | 10/2015 | Flowers | G06F 1/3296 | 713/323 |
| 2016/0267319 A1* | 9/2016 | Murillo | G06K 9/00255 | |

* cited by examiner

DISPLAY APPARATUS WITH RF SENSOR AND USER DETECTION METHOD USING RF SENSOR

CROSS-REFERENCE TO RELATED APPLICATION

This application claims priority from Korean Patent Application No. 10-2014-0107962, filed on Aug. 19, 2014 in the Korean Intellectual Property Office, the disclosure of which is incorporated herein by reference in its entirety.

BACKGROUND

Field

Apparatuses and methods consistent with the exemplary embodiments relate to a display apparatus with a radio frequency (RF) sensor and a user detection method using an RF sensor.

Description of the Related Art

A lot of the technology for detecting a human body has been developed in the form of transmitting a detection signal to an object and receiving a behavior or signal reflected from the object while maintaining an open distance and space as a range for detection. Further, a conventional technology for detecting a human body has used a method of detecting the human body by sensing infrared or far-infrared rays from in front of an object in which there are no obstacles between the object and the sensor, and in which there is a short distance between the object and the sensor.

However, conventional infrared or far-infrared sensors cannot detect a desired object if hot-line information, i.e. separate biometric data, sound waves, a variety of wireless information, etc. is not received from the object's mobile device, radio set or the like due to closures or obstacles. Most detection methods operate only within a user's visible area, and thus a detecting function itself becomes meaningless since detection is impossible when there is an obstacle.

In an actual space which is not open but closed with an obstacle, a human body is detected by a method of transmitting a radio frequency (RF) signal and receiving waves reflected from an object. However, such a method of using the radio frequency to detect a human body has been applied to some industrial fields that do not require forcible wireless model recognition, such as a military purpose, and is thus not applied or utilized for most general products.

Recently, a narrower bezel has been applied to the display apparatus so that most of a front surface of the display apparatus is an effective screen. However, the technology of applying a radio frequency (RF) sensor to the display apparatus cannot be put to practical use since the RF sensor is relatively bulky as compared with a far-infrared or infrared sensor.

SUMMARY

An aspect of an exemplary embodiment provides a display apparatus and a user detection method of the same, in which a novel mounting technique is applied so that a user cannot recognize a sensor which recognizes the human or a human sensing state. Further, the sensor which recognizes the human can be easily mounted on the display apparatus such as a large format display television, a large format display (LFD) sign board, a monitor, etc. when the display apparatuses have a display panel on which it is difficult to mount a sensor to a front visible portion because of design and mechanical issues.

Another exemplary embodiment provides a display apparatus and a user detection method of the same, which includes an RF sensor capable of accurately detecting a user among a plurality of sensed objects.

Still another exemplary embodiment is to provide a display apparatus and a user detection method of the same, in which power of the display apparatus is managed in accordance with the presence of a user, thereby saving energy.

Yet another exemplary embodiment is to provide a display apparatus and a user detection method of the same, in which noise can be eliminated from reflective waves reflected from an object, thereby accurately detecting a user.

According to an aspect of another exemplary embodiment, there is provided a display apparatus including: a display panel configured to display an image; a support frame located in a back area of the display panel and configured to support parts of the display apparatus; and a radio frequency (RF) sensor configured to be arranged in the support frame for performing one of transmitting a radio frequency signal to a front area of the display panel and receiving the radio frequency signal from the front area of the display panel, wherein the radio frequency signal which is transmitted or received passes through the display panel.

The display apparatus according to an exemplary embodiment is aesthetically pleasing to a user since the RF sensor is arranged behind the display panel and is not exposed to a user. Further, the radio frequency signal is transmitted and received while passing through the display panel and the support frame. Therefore, a user can be sensed within a wide range in front of the display panel.

The support frame may include a through portion via which the radio frequency signal can be transmitted and received, thereby minimizing attenuation of the radio frequency for sensing a user and improving a sensing accuracy.

The RF sensor may include an RF transceiver, and the RF transceiver is at least partially accommodated inside the through portion. Since only the minimum portion of the frame is opened, manufacturing can be easily performed and functions of a part of the display apparatus, such as a backlight unit in front of the display panel, are maximally maintained.

The RF transceiver may be coated or shielded with a material for preventing light leakage, thereby preventing light loss of the backlight unit in the through portion.

The RF sensor may include a low noise amplifier (LNA), thereby eliminating noise which is absorbed while passing through the display panel and thus improving the accuracy in sensing a user.

The display apparatus may further include an infrared sensor in accordance with the functions of the display apparatus that are used, thereby having a trigger function for the RF sensor which saves energy.

The RF sensor may be turned on or a transmission frequency of the RF sensor may be amplified, based on a sensing result of the infrared sensor. Therefore, the RF sensor can be turned off or sensitivity can be lowered if a user is absent, thereby saving energy while driving the RF sensor.

The display apparatus may be turned on by a trigger function for controlling the power of the display apparatus when the RF sensor senses a human or that a human is positioned within a predetermined distance range. Thus, it is possible to save energy consumed by the display apparatus when a user is absent.

The RF sensor may be turned off after the display apparatus is turned on. The RF sensor stops operating while the display apparatus operates, thereby saving energy which can be wasted while driving the RF sensor.

The display apparatus may be turned off when the RF sensor senses that a human is not present or that a human is positioned beyond a predetermined distance range. Therefore, the amount of energy consumed by the display apparatus is decreased when a user is absent.

Only a certain function of the display apparatus is activated when the RF sensor senses a human or that a human is positioned within a predetermined distance range. Therefore, only minimum functions are offered to a user and energy is saved since unnecessary operations of the display apparatus are not offered.

With the trigger function of the RF sensor, standby power for the display apparatus may be turned on. Therefore, the standby power for the display apparatus can be also turned off when a user is absent, thereby saving energy which is consumed by the display apparatus.

With the trigger function of the RF sensor, a part of a backlight unit for the display apparatus may be operated so that information can be displayed on a local area of the display panel, thereby offering only the minimum information needed by a user.

A graphic user interface (GUI) corresponding to a subject or a shape of a user is displayed on the display panel in response to sensing that a user approaches the display apparatus, and the displayed GUI is faded out in response to sensing that the user moves away from the display apparatus. Thus, a user detection result is visually displayed, thereby improving user convenience.

A user's figure may be displayed as a motion graphic user interface (GUI) of an outer profile illustration in response to sensing that a user approaches the display apparatus.

The RF sensor may be integrally or separately mounted to the support frame, thereby improving the degree of freedom in the design of the display apparatus.

The display panel may include a liquid crystal display panel. The display apparatus may include a panel driver configured to display an image on the liquid crystal display panel, and a controller configured to control the panel driver. In response to the display apparatus being turned on, a radio frequency signal of the RF sensor may be emitted in sync with a period of an image display timing of the panel driver and the controller at which a liquid crystal of the liquid crystal display panel is oriented to enable light to pass through the liquid crystal display panel. Thus, the radio frequency signal can be transmitted with minimum interruption to the liquid crystal layer while the liquid crystal display device operates.

The period may include a liquid crystal operating period or a screen switching period.

The RF sensor is configured to lower a power for transmitting the radio frequency signal in response to a detection result being repeatedly one of a short distance detection result and a long distance detection result. Therefore, an untargeted object is prevented from being recognized as a user and also energy consumption is decreased or prevented.

The RF sensor may determine a detection error in response to a frequency range of a reflective wave being beyond a predetermined range. Therefore, an untargeted object is prevented from being recognized as a user.

According to an aspect of another exemplary embodiment, there is provided a user detection method of a display apparatus with a display panel for displaying an image, the method including: emitting, by a radio frequency (RF) sensor arranged in a support frame in a back of the display panel, a radio frequency signal configured to pass through the display panel, receiving a reflective wave of the emitted radio frequency signal, which is reflected from an object positioned in front of the display panel, through the display panel, and recognizing the object as a user in response to determining based on the received reflective wave that the object is placed within a predetermined distance range or that a frequency range of the reflective wave is within a predetermined frequency range.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF EXEMPLARY EMBODIMENTS

Below, exemplary embodiments will be described in detail with reference to accompanying drawings. The following exemplary embodiments describe only configurations directly related to the present inventive concept, and the descriptions of the other configurations will be omitted. However, it will be understood that the omitted configurations are not unnecessary in realizing an apparatus or system to which the inventive concept is applied. Further, like numerals refer to like elements throughout.

Figure 1:
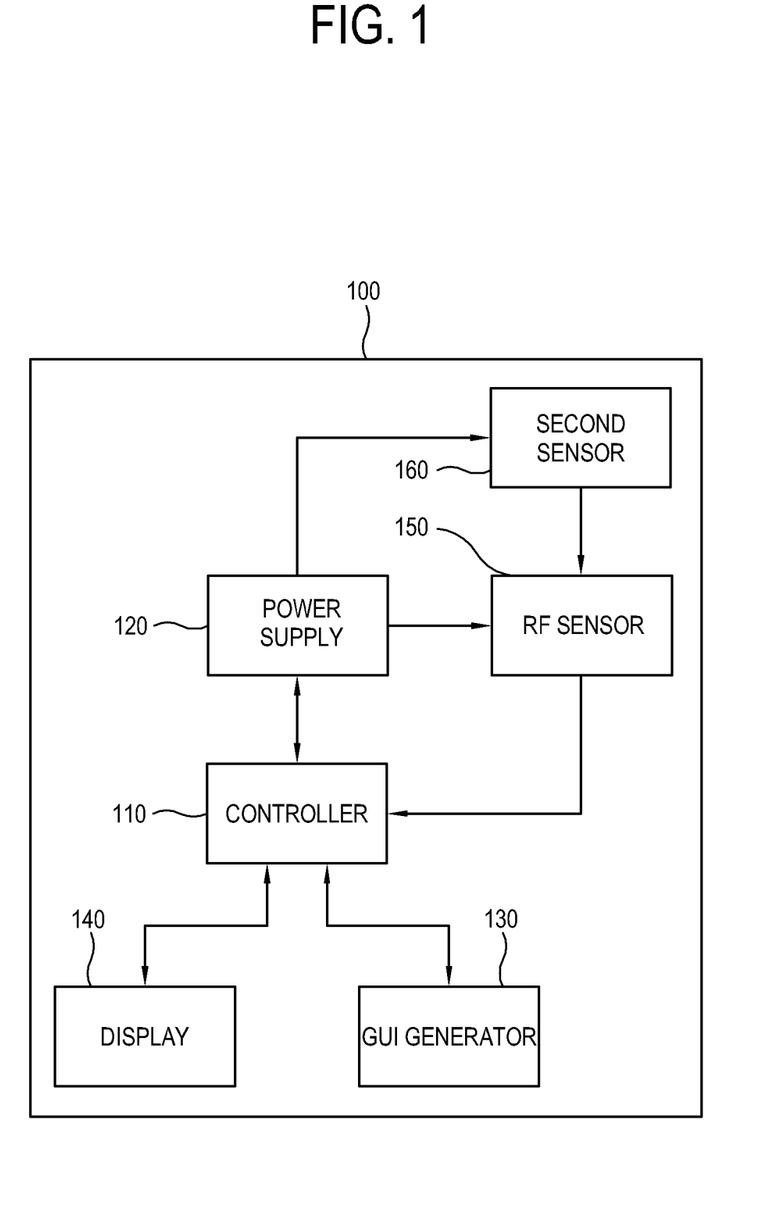
FIG. 1 is a block diagram of a display apparatus according to an exemplary embodiment.

FIG. 1 schematically shows a display apparatus 100 according to an exemplary embodiment. As shown in FIG. 1, the display apparatus 100 may include a controller 110 for processing an image, a power supply 120, a graphic user interface (GUI) generator 130, a display 140, and a RF sensor 150, and a second sensor 160. Further, the display apparatus 100 may include more elements such as an image receiver (not shown), a tuner, an image processor (not shown) for processing a received image, a wired/wireless communicator (not shown), a timing controller (not shown), a voice processor (not shown), etc. in addition to the foregoing elements, and detailed descriptions thereof will be omitted for brevity.

The controller 110 controls the respective elements, e.g., the power supply 120, the GUI generator 130, the display 140, etc. of the display apparatus 100.

The controller 110 determines whether a user approaches or moves away from the RF sensor 150 and the second sensor 160 and analyzes the user's intent with regard to powering the display apparatus on or off. If a user approaches a power button provided on a remote controller or on the display apparatus 100 in order to turn the display apparatus 100 on or off, the display apparatus 100 is automatically turned on or off. Therefore, the display apparatus 100 is more quickly turned on or off than when a user actually (physically) turns the display apparatus 100 on or off.

The controller 110 may turn on a backlight which corresponds to only a certain area, and thus control to display a preset screen on a partial screen in accordance with results from recognizing a user.

Figure 8:
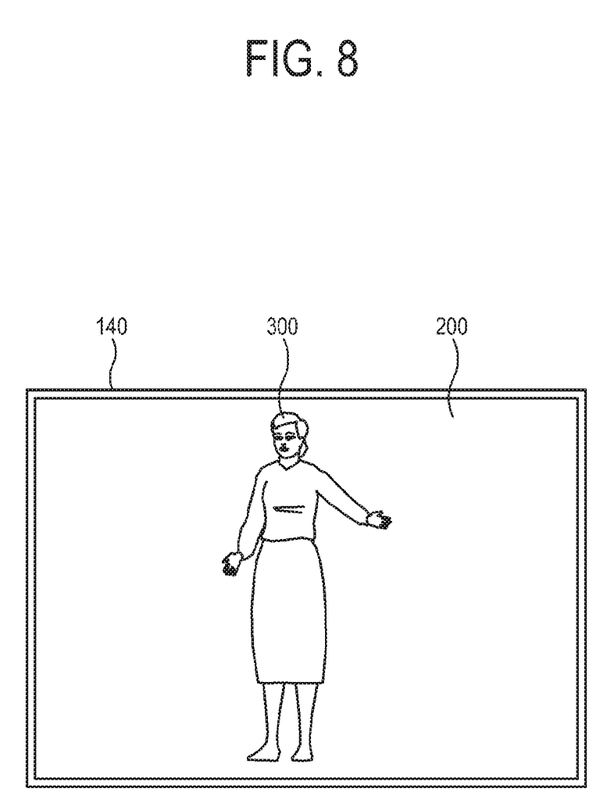
FIG. 8 is a view showing a graphic user interface (GUI) according to an exemplary embodiment.

According to a human body sensing result, the controller 110 may control the image processor (not shown) to provide a graphic user interface (GUI) 300 of a subject or a shape corresponding to a user, e.g., an illustration or image based on a user's outer profile, on a screen when a user approaches the corresponding area, and makes the illustration or image fade out when a user moves away from the corresponding area. Further, the controller 110 may control the image processor (not shown) to display a user's figure in the form of an outer profile illustration as a motion graphic user interface.

The controller 110 may include application specific integrated circuits (ASICs), digital signal processors (DSPs), digital signal processing devices (DSPDs), programmable logic devices (PLDs), field programmable gate arrays (FPGAs), micro-controllers, microprocessors, etc.

The power supply 120 may supply power to various parts of the display apparatus 100, for example, the controller 110, the display 140, the RF sensor 150 and the second sensor 160, etc.

The power supply 120 supplies power to the main body or respective parts of the display apparatus 100 under the control of the controller 110. At this time, the controller 110 may control the power supplied to the main body or respective parts of the display apparatus 100 in accordance with results of sensing a user from the RF sensor 150 and the second sensor 160.

The power supply 120 may maintain a power-on state of the RF sensor 150 and/or the second sensor 160 even when the display apparatus 100 is powered off. Alternatively, the power supply 120 may change the state of the RF sensor 150 and/or the second sensor 160 into a power-off state even when the display apparatus 100 is powered on.

The GUI generator 130 may generate a graphic user interface (GUI) for receiving a user's command and display the GUI on the display 140. The GUI generator 130 may generate the GUI under the control of the controller 110 so that a user can directly issue a command through an input unit such as a touch screen, a remote controller (not shown), etc. in accordance with results of sensing the user from the RF sensor 150 and/or the second sensor 160. The generated graphic user interface (GUI) is displayed on the display panel with a subject or a shape of a user, in response to sensing that the user approaches the display apparatus. The displayed GUI fades out in response to sensing that the user moves away from the display apparatus.

The display 140 can display an image or a graphic processed by an image processor (not shown) or a graphic processor (not shown). The display 140 may be a liquid crystal display (LCD) panel including a liquid crystal layer, an organic light emitting display (OLED) panel including an organic light emitting layer, a plasma display panel (PDP), etc., but the types of displays are not limited thereto.

In accordance with a type of the display panel, the display 140 may include additional elements. For example, in the case of an LCD type, the display 140 may include a backlight and a prism film, a polarization film, an LCD cell, a color filter, etc. in accordance with polarizing properties, condensing properties of light, etc.

The RF sensor 150 detects a frequency which varies depending on a distance by the Doppler effect of transmitting a radio wave of a certain frequency, e.g., a microwave and senses a reflected wave of the corresponding signal to output a detection signal. The Doppler effect is the change in the frequency of a wave reflected from a moving object. There is no change in frequency when the wave is reflected from a stationary object. When an object is moving toward the transmitter, the frequency becomes shorter. On the other hand, when an object is moving away from the transmitter, the frequency becomes longer. Therefore, based on the change in frequency, it is possible to determine whether there is a moving object, where the object is moving, how fast the object moves, and so on. The radio frequency employed in the RF sensor 150 can be transmitted and received passing through an obstacle, and thus can be transmitted to a wide area. However, the RF sensor 150 is more expensive and occupies a larger space than the infrared sensor.

The second sensor 160 may include a human body temperature sensor based on infrared, such as, for example, a bolometer. The second sensor 160 may be mounted to an IR transceiver (not shown) for performing control related to a remote controller. The infrared sensor is classified into an active type that emits infrared by itself and senses the interception of a returned heliograph of the infrared, and a passive type which does not include an emitter and only reads changes in infrared which is received externally. The infrared refers to a radiant ray that has a wavelength longer than red light of visible light and is shorter than a microwave among spectrums of an electromagnetic wave, i.e., has a wavelength of 0.75 µm~1 mm.

A sensing result of the second sensor 160 may be used as trigger data for turning the RF sensor 150 on or amplifying a transmission frequency. That is, in the state that the display apparatus 100 is fully turned off and the RF sensor 150 is fully turned off or operates with low sensitivity when a user is absent, the RF sensor 150 may be turned on or the transmission frequency of the RF sensor 150 may be amplified, in response to a user sensing result of the second sensor 160. Then, if the RF sensor 150 senses a user, the display apparatus 100 may be turned on or operate with standby power, or only a certain function of the display apparatus 100 may be activated.

Of course, the second sensor 160 may be selectively applied, and only the RF sensor 150 may be used in order to have a user recognition effect according to an exemplary embodiment.

Figure 2:
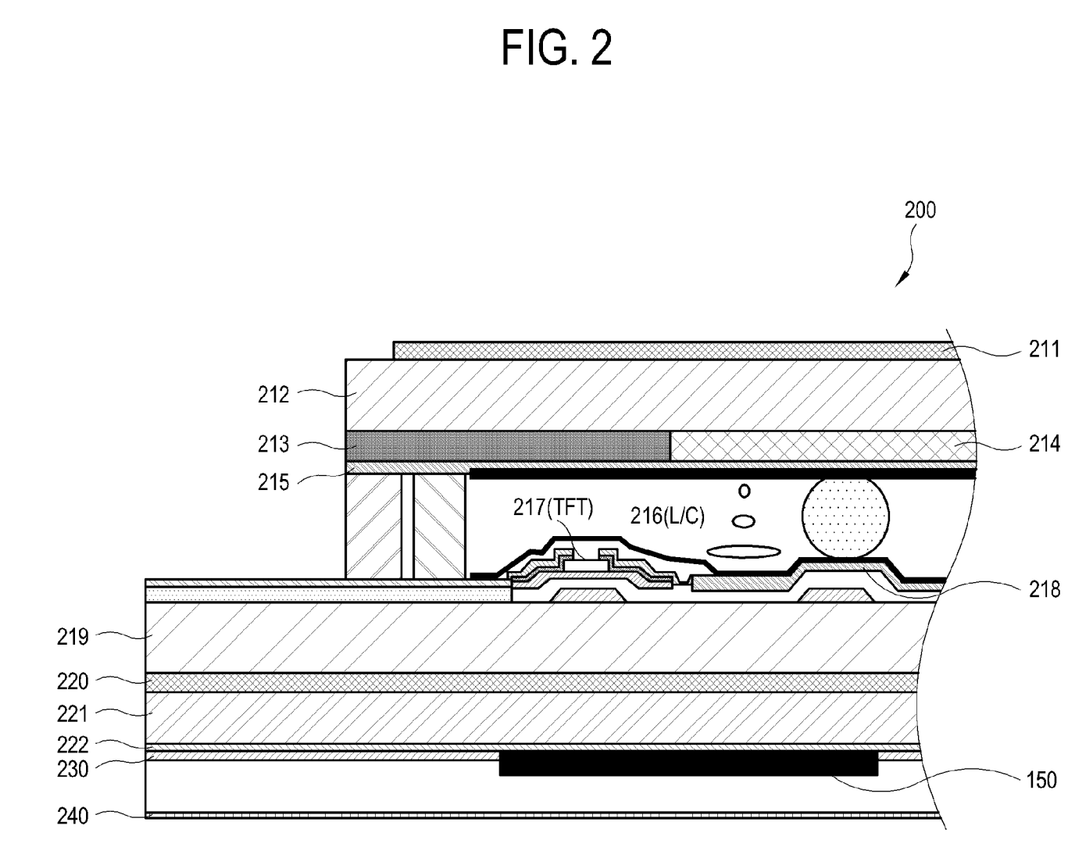
FIG. 2 is a sectional view schematically showing a display panel according to an exemplary embodiment.

FIG. 2 is a sectional view schematically showing a display panel 200 that constitutes the display 140 of the display apparatus 100 according to an exemplary embodiment. The display panel 200 may employ a liquid crystal display panel, a plasma display panel, an organic light emitting display (OLED) panel, etc. In this exemplary embodiment, the liquid crystal display (LCD) panel will be described as an example.

The LCD panel 200 may include a first polarization film 211, a first transparent substrate 212, a black matrix 213, a color filter 214, a common electrode (indium tin oxide (ITO)) 215, a liquid crystal layer 216, a thin film transistor (TFT) 217, a pixel electrode 218, a second transparent substrate 219, a second polarization film 220, a backlight light guiding plate 221, a reflective plate 222, etc. in sequence from the top of the LCD panel. The common electrode 215 is formed throughout the entire surface of the first transparent substrate 212 and receives common voltage. The pixel electrode 218, the common electrode 215 and the liquid crystal layer 216 sandwiched between the pixel electrode 218 and the common electrode 215 constitute a liquid crystal condenser, and the liquid crystal condenser and the thin film transistor 217 connected to the liquid crystal condenser are used as a basic unit of a pixel. When a voltage is applied to the pixel electrode 218 and the common electrode 215, an electric field is formed in the liquid crystal layer 216. By adjusting the strength of the electric field, the transmittance of the liquid crystal layer is controlled, to thereby display an image.

Figure 3:
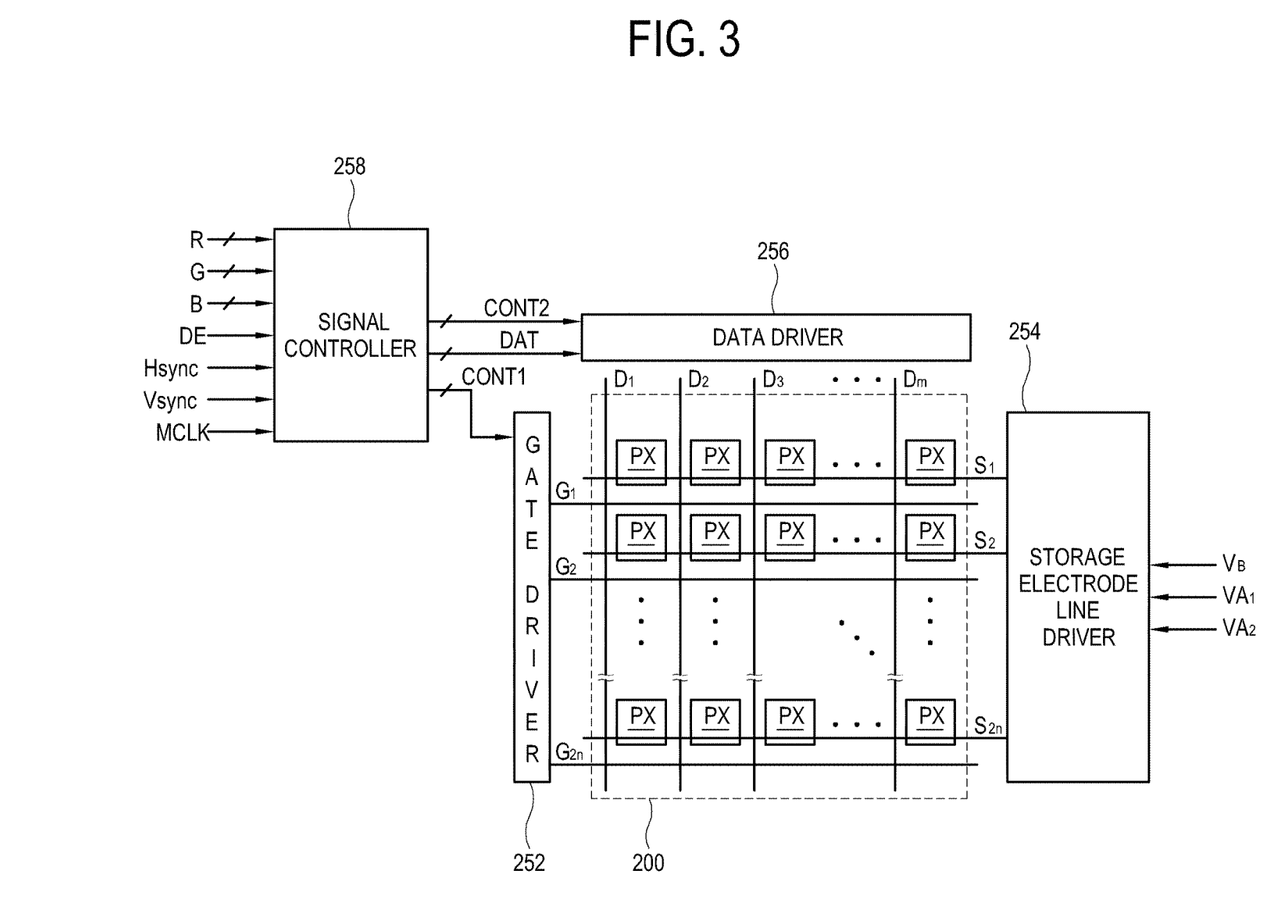
FIG. 3 is a block diagram showing a configuration of applying voltage to a pixel electrode 218 and a common electrode 215 of a liquid crystal display 200 of FIG. 2 according to an exemplary embodiment.

As shown in FIG. 3, the pixel electrode 218 of the liquid crystal display panel 200 may include gate lines G1-G2n, storage electrode lines S1-S2n, and data electrode lines D1-Dm. The gate lines G1-G2n connect with a gate driver 252, the storage electrode lines S1-S2n connect with a storage electrode line driver 254, and the data electrode lines D1-Dm connect with a data driver 256. Further, the respective electrode drivers 252, 254 and 256 are connected to a signal controller 258.

The gate driver 252 applies a gate on voltage to the gate lines G1-G2n in response to a gate control signal CONT1 from the signal controller 258 so that the thin film transistor 217, connected as switching devices to the gate lines G1-G2n, can be turned on. Then, a data signal applied to the data lines D1-Dm is applied to a corresponding pixel PX through the turned-on thin film transistor 217.

The storage electrode line driver 254 applies a storage voltage having levels which correspond to external control signals VB, VA1 and VA2 to the storage electrode lines S1-S2n, thereby changing the voltage applied to the pixel electrode 218, i.e. a pixel electrode voltage.

The signal controller 258 processes input image signals R, G and B in accordance with operating conditions for the liquid crystal display panel 200, based on the input image signals R, G and B and the input control signal, and generates a gate control signal CONT1 and a data control signal CONT2, thereby outputting the gate control signal CONT1 to the gate driver 252 and outputting the data control signal CONT2 and the process image signal DAT to the data driver 256. In response to the data control signal CONT2 from the signal controller 258, the data driver 256 receives a digital image signal DAT for pixels PX, selects a gradation voltage corresponding to each digital image signal DAT, converts the digital image signal DAT into an analog data signal, and applies the analog data signal to the data lines D1-Dm to display an image.

In the back of the liquid crystal display panel 200, i.e. in the back of the reflective plate 222, a support frame 230 made of metal or the like is arranged to support the liquid crystal display panel 200. Further, the support frame 230 may hold and support driving circuits for the RF sensor 150 and the liquid crystal display panel 200, such as, for example, an image board (not shown), a graphic board (not shown), an XY electrode driver, etc. provided in the form of a printed circuit board (PCB). In addition, a cover 240 may be coupled to the back of the support frame 230 leaving a predetermined space behind the support frame 230.

Figure 4:
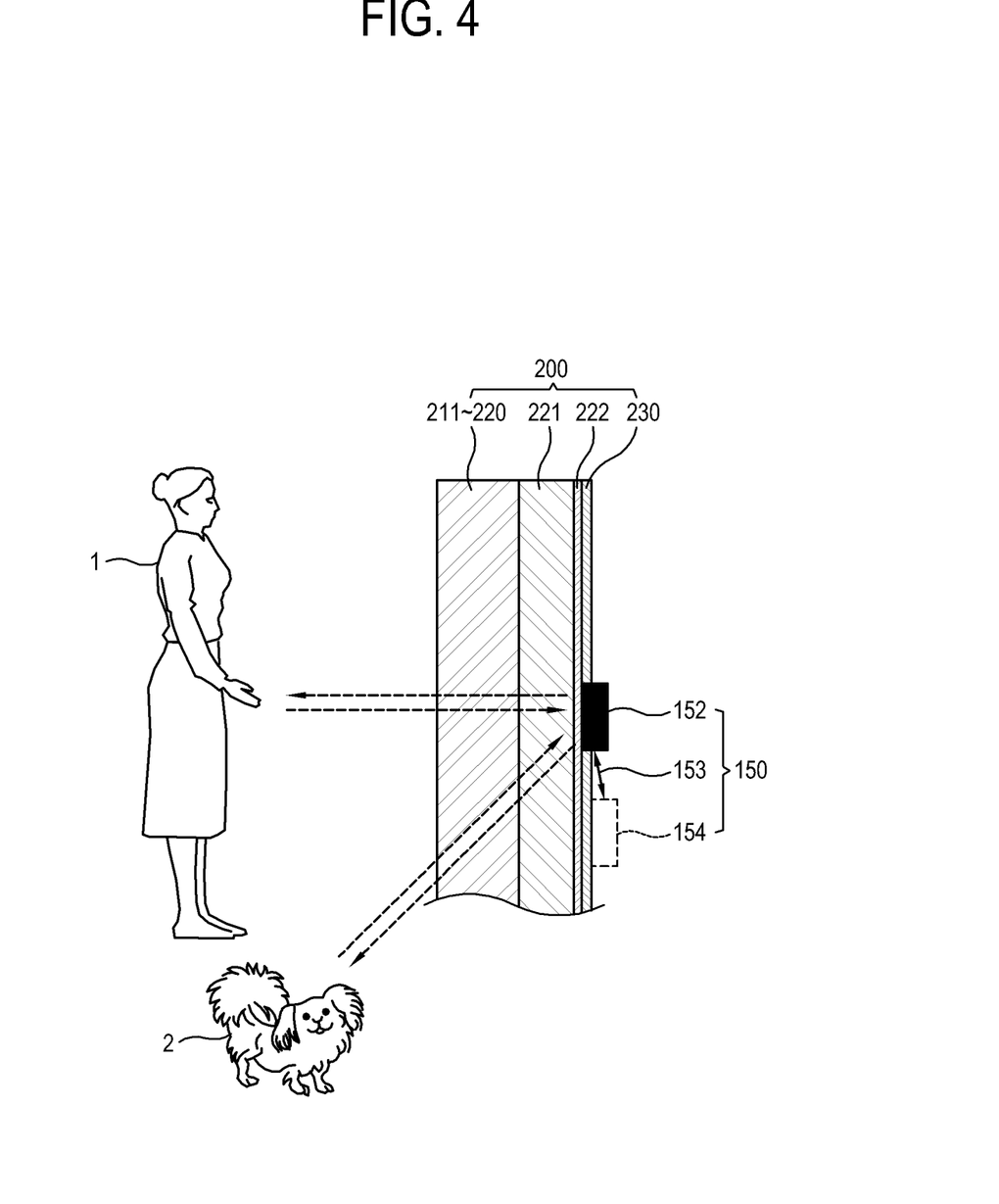
FIG. 4 is a schematic view showing a method of installing an RF sensor on a display apparatus according to an exemplary embodiment.

FIG. 4 is a schematic view showing a method of installing an RF sensor on a display apparatus according to an exemplary embodiment.

The RF sensor 150 may be integrally or separately mounted to the support frame 230 so as not to be visible from the front of the liquid crystal display panel 200. In particular, the support frame 230 is generally made of aluminum, iron, stainless steel, or the like metallic material. The support frame 230 is formed with a through hole (232) via which a radio frequency sensing signal can be easily passed, so that the RF sensor 150 can be at least partially inserted and installed in the through hole (232). The through hole (232) of the support frame 230 is formed so as to be small enough to insert only an RF transceiver 152 of the RF sensor 150. The surface of the RF transceiver 152 inserted in the through hole (232) of the support frame 230 may be coated or shielded so as to prevent light of a backlight unit from leaking frontward.

Of course, if the support frame 230 is made of a material through which the radio frequency signal can pass, there is no need for a through hole (232).

As a result, the radio frequency sensing signal emitted from the RF sensor 150 passes through the through hole (232), and is then emitted toward a frontward direction of the liquid crystal display panel 200 while penetrating the front of the liquid crystal display panel 200. At this time, reflective waves reflected from an object located in front of the liquid crystal display panel, for example, a user 1 or a pet dog 2, are received in a receiver installed in the liquid crystal display panel 200 and the through hole (232).

The RF sensor 150 may include the RF transceiver 152, an RF sensor module 154, and a connection line 156 for connecting the RF transceiver 152 and the RF sensor module 154.

Figure 5:
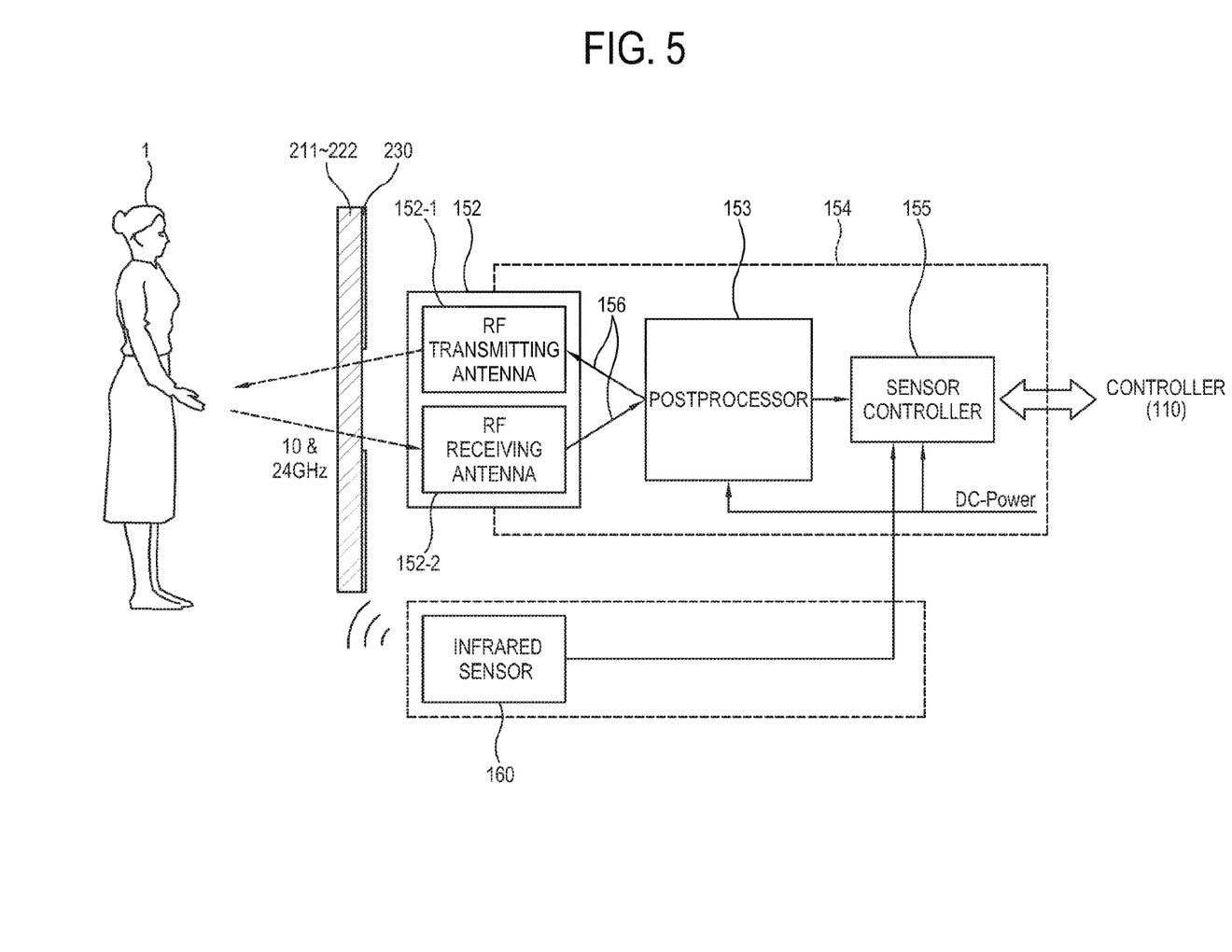
FIG. 5 is a block diagram of an RF sensor module according to an exemplary embodiment.

FIG. 5 is a block diagram of the RF sensor 150 and the infrared sensor 160 according to an exemplary embodiment The RF transceiver 152 includes an RF transmitting antenna 152-1 for transmitting the radio frequency sensing signal and an RF receiving antenna 152-2 for receiving reflective waves reflected from an object.

The RF transceiver 152 may connect with the RF sensor module 154 by the connection line 156.

The RF sensor module 154 may include a postprocessor 153 and a sensor controller 155 to generate the radio frequency emitted from the RF transceiver 152 and process the received reflective waves.

The postprocessor 153 may include an amplifier (AMP), a resonator, a filter, an analog-to-digital converter (ADC), a field effect transistor (FET), a monolithic microwave integrated circuit (MMIC), etc.

The sensor controller 155 receives and processes a command or data from a product, e.g., the controller 110 of the display apparatus 100, or processes and analyzes a signal from the postprocessor 153, thereby transmitting the processed signal to the controller 110 of the display apparatus 100. The sensor controller 155 may include a microprocessor (MCU), a universal serial bus (USB) interface, an Inter-Integrated Circuit (I2C) interface, etc.

The second sensor 160, which is an infrared sensor, may determine the proximity of a user or the departure of a user and preemptively analyze a user's intent, thereby providing a trigger function to quickly power the display device on or off.

Figure 6:
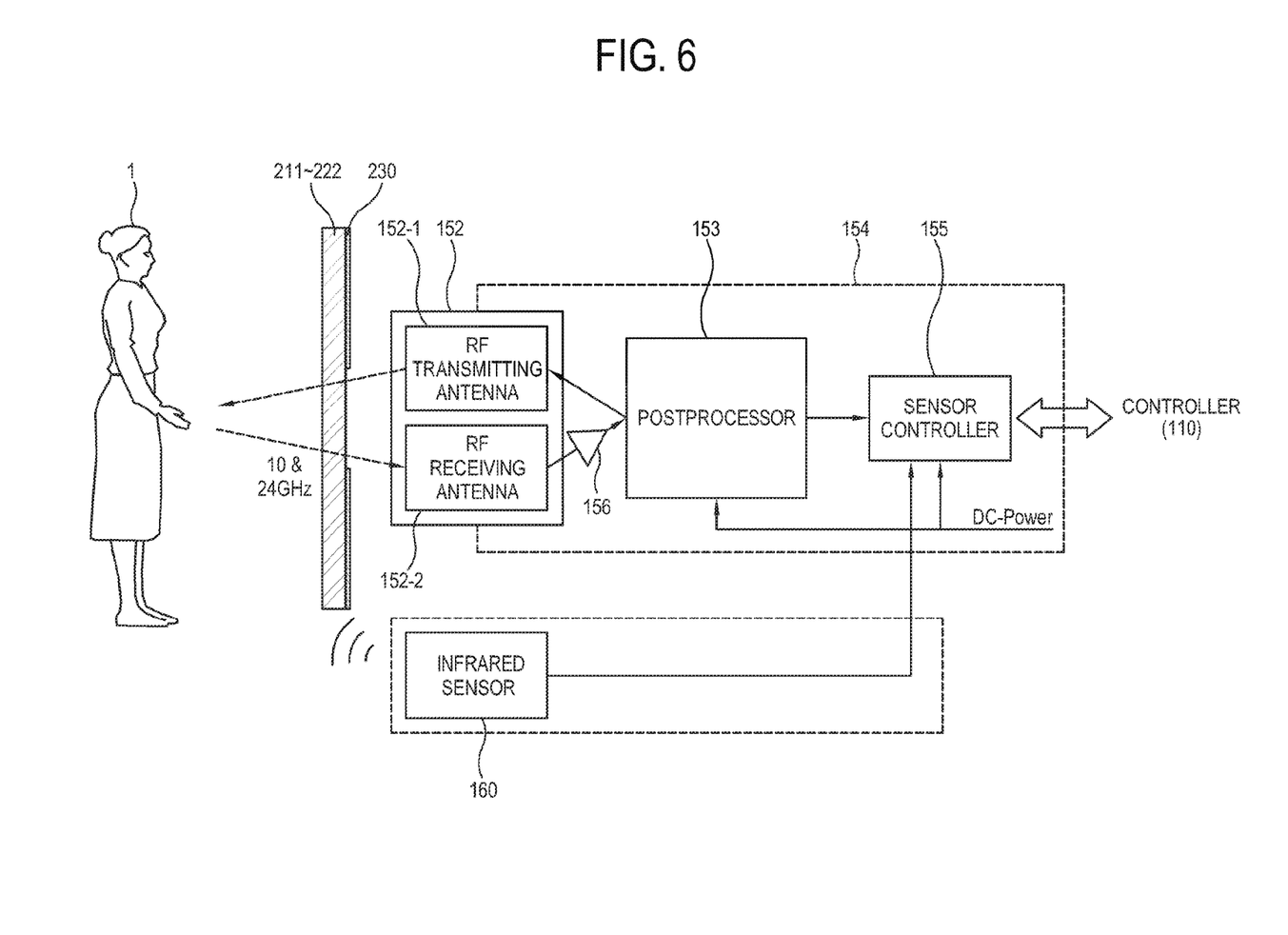
FIG. 6 is a block diagram of an RF sensor module according to another exemplary embodiment.

FIG. 6 is a block diagram of an RF sensor module according to another exemplary embodiment.

According to this exemplary embodiment, the radio frequency signal for detecting a user is transmitted and received while penetrating the liquid crystal display panel 200. However, the liquid crystal display panel 200 includes the common electrode 215, the pixel electrode 218, the TFT 217, etc. which interrupts the penetration of the radio frequency signal. Further, signal frequencies generated in accordance with operations of the liquid crystal display panel are likely to be mixed with the transmitted and received reflective waves. Accordingly, a low noise amplifier 157 may be added in between the RF receiving antenna 152-2 and the postprocessor 153.

Figure 7:
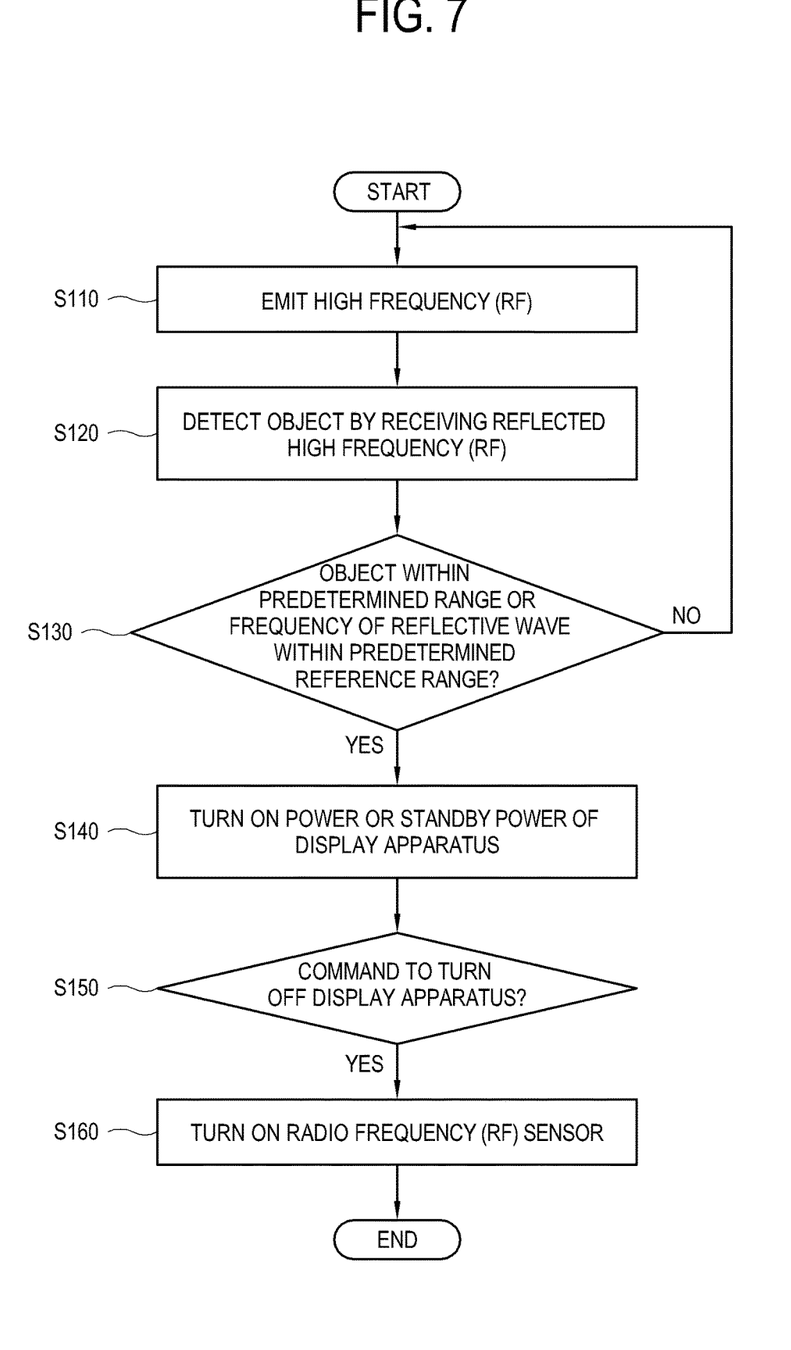
FIG. 7 is a flowchart showing a user detection method of a display apparatus according to an exemplary embodiment.

Below, a method of detecting a user of the display apparatus 100 according to an exemplary embodiment will be described with reference to FIG. 7.

At operation S110, for example, a radio frequency signal having a frequency of 10 GHz, 24 GHz, 66 GHz or 77 GHz is emitted in a frontward direction of the display panel 200 through the RF receiving antenna 152-1.

At operation S120, reflective waves resulting from reflecting the emitted radio frequency signal to, for example, objects such as a user 1 and a pet dog 2 are received through the RF receiving antenna 152-2. Since a signal detected by the RF receiving antenna 152-2 is very weak, the signal is amplified through the low noise amplifier (LNA) 157 and then transmitted to the postprocessor 153.

To smoothly perform operations S110-S120, the radio frequency sensing signal has to be transmitted by a proper algorithm in accordance with a mechanism for operating the liquid crystal display panel 200. As shown in FIG. 2, transparent electric conductivities of indium tin oxide (ITO) for various wirings are distributed throughout the liquid crystal display panel 200 and block radio waves. Therefore, it is very difficult to substantially detect the radio waves that go out and come back to penetrate the liquid crystal display panel 200.

The radio frequency signal has a very short wavelength of about 10 GHz, 24 GHz, 66 GHz or 77 GHz, and is thus interrupted by liquid crystal molecules of the liquid crystal layer. Therefore, the RF signal may be emitted periodically when the liquid crystal (LC) of the liquid crystal display panel 200 is oriented to have the maximum transmittance. The orientation of the liquid crystal (LC) of the liquid crystal display panel 200 is changed when a voltage is applied to the pixel electrode 218, to thereby display an image. To display an image, the orientation of the liquid crystal (LC) is controlled in such a manner that the signal controller 258 of FIG. 3 processes input image signals R, G, B to supply an image signal DAT to the data driver 256, and the storage electrode line driver 254 applies storage voltage to the storage electrode lines S1-S2n based on external control signals VB, VA1, VA2.

Thus, the orientation of the liquid crystal (LC) has the maximum transmittance when light fully penetrates the liquid crystal (LC) in the liquid crystal layer of the liquid crystal display panel 200. The RF sensor 150 periodically generates a radio frequency signal in sync with an image displaying operation of at least one among the signal controller 258, the data driver 256 and the storage electrode lines driver 254, thereby emitting the radio frequency signal without any interruption of the liquid crystal layer (LC). That is, the RF sensor 150 periodically emits the radio frequency signal in sync with the operations of the signal controller 258, the data driver 256 and the storage electrode lines driver 254. For example, in sync with a periodic change of the orientation of the liquid crystal, i.e., at a screen switching frequency of 240 Hz, 120 Hz or 60 Hz.

At operation S130, the sensor controller 155 determines an object as a user when the object which is sensed based on a reflective wave is placed within a predetermined distance range or the reflective wave belongs to a predetermined frequency range. If the object is outside of a preset distance range or the reflective wave is beyond a preset frequency range, the object may be not determined as a user. If RF reception is beyond a reference range for a certain reflective wave, an object is determined as not being a user 1 but another object 2, such as, a pet dog or a toy, and excluded from targets for detection. Further, if there are a lot of detections which are performed at a short distance, the total power consumption is reduced by lowering the output power of the MMIC and the FET of the postprocessor 153 or decreasing a gain of the low noise amplifier 157. Likewise, if detections at a long distance are repeated for a predetermined period of time, total power consumption is reduced by lowering the output power of the MMIC and the FET of the postprocessor 153 or decreasing the gain of the low noise amplifier 157.

If a user detection result is transmitted to the controller 110 of the display apparatus 100 in the operation S130, at operation S140 the controller 110 controls the power supply 120 to activate a certain function of the display apparatus 100, for example, supplying power for a main body or only supply standby power. For instance, the controller 110 of the display apparatus 100 turns on only a part of the backlight unit, and thus displays only a part of an image, thereby providing information. Accordingly, the proximity or departure of a user is determined based on the sensed result, and a user's intent of turning the display apparatus 100 on or off is preemptively analyzed.

When a user approaches the display apparatus 100 so as to use the power button of the remote controller or the main body of the display apparatus 100 to turn the display apparatus 100 on or off, the display apparatus 100 provides a previous trigger function to be quickly turned on or off. For example, the display apparatus 100 may be automatically turned on when a user's behavior has the intent of turning on the display apparatus 100. Further, if a user is out of a designated sensing zone within a predetermined period of time without performing any behavior for turning the display apparatus 100 off, the controller 110 monitors whether a user enters the designated sensing zone again within the predetermined period of time and turns the display apparatus 100 off when a user does not enter the designated sensing zone within the predetermined period of time.

At operation S130, if the user detection result is transmitted to the controller 110 of the display apparatus 100, the controller 110 may display the proximity of the user or a departure of a user through a graphic user interface (GUI) (300) corresponding to a subject or shape of a user. For example, the controller 110 controls the display panel 200 to provide an image based on a user's outer profile in response to received user recognition data, and makes the image fade out when a user goes away from the corresponding area. Further, the controller 110 may display a user's figure as a motion on a graphic user interface and in the form of a certain outer profile illustration based on the received recognition data.

At operation 5150, if a user or the controller 110 issues a command to turn off the main body of the display apparatus 100, the RF sensor 150 or infrared sensor 160 may be turned on at 5160. Of course, this refers to a case of turning on the display apparatus 100 while the RF sensor 150 or the infrared sensor 160 is being turned off.

According to an exemplary embodiment, the infrared sensor 160 is added to first detect an object while a product provided with the display panel 200, e.g., the display apparatus 100, a vending machine (not shown), a customer information system (not shown), etc., is being powered off. If a sensing reference condition of a predetermined level is satisfied based on the sensing result of the infrared sensor 160, the RF sensor 150 may be powered on, or the power of the RF transmitter is forcibly amplified by the FET and MMIC of the postprocessor 153 to improve transmittance to radio waves.

According to an exemplary embodiment, a human sensor can be easily mounted on the display apparatus such as a large format display television, a large format display (LFD) sign board, a monitor, etc. even though it may be difficult to mount a sensor to a front visible portion of the display panel because of design and mechanical issues.

Further, it is possible to accurately detect a user among a plurality of sensed objects, to save energy by managing power of the display apparatus in accordance with presence of a user, and to accurately detect a user since noise can be eliminated from reflective waves reflected from an object.

In addition, an RF sensor is used so that a human body can be sensed even though the human body is not in an open space, but is in a closed space or blocked by an obstacle. Therefore, the display apparatus can be operated by pre-emptively considering a user's intent.

Although a few exemplary embodiments have been shown and described, it will be appreciated by those skilled in the art that changes may be made in these exemplary embodiments without departing from the inventive concept. Therefore, the foregoing has to be considered as illustrative only. The scope of the exemplary embodiments is defined in the appended claims and their equivalents. Accordingly, all suitable modification and equivalents may fall within the scope of exemplary embodiments.

What is claimed is:

1. A display apparatus comprising:
   a display panel configured to display an image;
   a support frame located in a back area of the display panel and configured to support parts of the display apparatus;
   a radio frequency (RF) sensor configured to be arranged in the support frame to transmit a radio frequency signal, which passes through the display panel, to a front area of the display panel and receive the radio frequency signal, which is reflected from an object positioned in the front area of the display panel, through the display panel; and
   a controller configured to:
      recognize the object as a user based on the received radio frequency signal of the RF sensor,
      determine whether the user approaches the display apparatus based on the user recognition result,
      in response to determining that the user approaches the display apparatus, generate an image corresponding to a figure of the user based on the user recognition result, and
      display on the display panel the image as a graphic user interface.

2. The display apparatus according to claim 1, wherein the support frame comprises a through portion via which the radio frequency signal is transmitted or received.

3. The display apparatus according to claim 2, wherein the RF sensor comprises an RF transceiver, and
   wherein the RF transceiver is at least partially accommodated inside the through portion.

4. The display apparatus according to claim 3, wherein the RF transceiver comprises one of a coating material and a shielding material configured to prevent light leakage.

5. The display apparatus according to claim 1, wherein the RF sensor comprises a low noise amplifier (LNA).

6. The display apparatus according to claim 1, further comprising an infrared sensor.

7. The display apparatus according to claim 6, wherein in response to a sensing result of the infrared sensor, performing one of turning the RF sensor on and amplifying a transmission frequency of the RF sensor.

8. The display apparatus according to claim 1, wherein the display apparatus is turned on in response to the RF sensor sensing a user.

9. The display apparatus according to claim 8, wherein the user is a human.

10. The display apparatus according to claim 7, wherein the RF sensor is configured to turn off after the display apparatus is turned on.

11. The display apparatus according to claim 1, wherein the display apparatus is configured to turn off in response to the RF sensor not sensing a user.

12. The display apparatus according to claim 1, wherein a predetermined function of the display apparatus is activated in response to the RF sensor sensing a user.

13. The display apparatus according to claim 12, wherein the predetermined function turns on a standby power for the display apparatus.

14. The display apparatus according to claim 12, wherein the predetermined function operates a part of a backlight unit for the display apparatus so that information can be displayed on a local area of the display panel.

15. The display apparatus according to claim 1, wherein the image fades out in response to sensing that the user moves away from the display apparatus.

16. The display apparatus according to claim 1, wherein the image is displayed as a motion graphic user interface (GUI) of an outer profile illustration corresponding to the figure of the user.

17. The display apparatus according to claim 1, wherein the RF sensor is integrally mounted or separately mounted to the support frame.

18. The display apparatus according to claim 1, wherein the display panel comprises a liquid crystal display panel,
   wherein the display apparatus comprises a panel driver configured to display an image on the liquid crystal display panel, and a controller configured to control the panel driver, and
   in response to the display apparatus being turned on, a radio frequency signal of the RF sensor is emitted in sync with a period of an image display timing of the panel driver and the controller at which a liquid crystal of the liquid crystal display panel is oriented to enable light to pass through the liquid crystal display panel.

19. The display apparatus according to claim 18, wherein the period comprises one of a liquid crystal operating period and a screen switching period.

20. The display apparatus according to claim 1, wherein the RF sensor is configured to lower a power for transmitting the radio frequency signal in response to one of a short distance detection and a long distance detection being repeated for a predetermined period of time.

21. The display apparatus according to claim 1, wherein the RF sensor determines the object as not being a user in response to a frequency range of a reflective wave being beyond a predetermined range.

22. A user detection method of a display apparatus with a display panel for displaying an image, the method comprising:
   emitting, by a radio frequency (RF) sensor arranged in a support frame in a back of the display panel, a radio frequency signal configured to pass through the display panel;

receiving a reflective wave of the emitted radio frequency signal, which is reflected from an object positioned in front of the display panel, through the display panel;

recognizing the object as a user based on the received reflective wave;

determining whether the user approaches the display apparatus based on a user recognition result;

in response to determining that the user approaches the display apparatus, generating an image corresponding to a figure of the user based on the user recognition result; and displaying on the display panel the image as a graphic user interface.

23. The method according to claim 22, further comprising amplifying a low noise of the received reflective waves.

24. The method according to claim 22, further comprising sensing the user through an infrared sensor.

25. The method according to claim 24, further comprising performing one of turning the RF sensor on and amplifying a transmission frequency of the RF sensor, based on a sensing result of the infrared sensor.

26. The method according to claim 22, further comprising in response to one of sensing a user and the user being positioned within a predetermined distance range of the display apparatus, turning on the display apparatus.

27. The method according to claim 22, further comprising in response to one of not sensing the user and the user being positioned beyond a predetermined distance range, turning the display apparatus off.

28. The method according to claim 22, further comprising activating a predetermined function of the display apparatus in response to sensing the user.

29. The method according to claim 28, wherein the predetermined function turns on a standby power for the display apparatus.

30. The method according to claim 28, wherein the predetermined function operates a part of a backlight unit for the display apparatus so that information can be displayed on a local area of the display panel.

31. The method according to claim 28, wherein the image fades out in response to sensing that the user moves away from the display apparatus.

32. The method according to claim 22, wherein the image is displayed as a motion graphic user interface (GUI) of an outer profile illustration.

33. The method according to claim 22, wherein the display panel comprises a liquid crystal display panel, wherein the display apparatus comprises a panel driver configured to display an image on the liquid crystal display panel, and a controller configured to control the panel driver, and in response to the display apparatus being turned on, a radio frequency signal of the RF sensor is emitted in sync with a period of an image display timing of the panel driver and the controller at which a liquid crystal of the liquid crystal display panel is oriented to enable light to pass through the liquid crystal display panel.

34. The method according to claim 33, wherein the period comprises one of a liquid crystal operating period and a screen switching period.

35. The method according to claim 22, wherein the RF sensor is configured to lower a power for transmitting the radio frequency signal in response to a detection result being repeatedly one of a short distance detection result and a long distance detection result.

36. The method according to claim 22, wherein the RF sensor determines the object as not being a user in response to a frequency range of a reflective wave being beyond a predetermined range.

* * * * *